United States Patent
Park et al.

(10) Patent No.: US 9,338,659 B2
(45) Date of Patent: May 10, 2016

(54) COMMUNICATION METHOD AND APPARATUS IN WIRELESS BODY AREA NETWORK

(75) Inventors: Seung-Hoon Park, Seoul (KR); Yongsuk Park, Seoul (KR); Jeongsik In, Yongin-si (KR); Eui-Jik Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 365 days.

(21) Appl. No.: 12/835,398

(22) Filed: Jul. 13, 2010

(65) Prior Publication Data

US 2011/0007672 A1 Jan. 13, 2011

(30) Foreign Application Priority Data

Jul. 13, 2009 (KR) .................. 10-2009-0063754

(51) Int. Cl.
| | |
|---|---|
| H04B 7/212 | (2006.01) |
| H04W 16/14 | (2009.01) |
| H04W 72/04 | (2009.01) |
| H04W 72/08 | (2009.01) |
| H04W 84/18 | (2009.01) |

(52) U.S. Cl.
CPC ............. *H04W 16/14* (2013.01); *H04B 7/212* (2013.01); *H04W 72/0426* (2013.01); *H04W 72/082* (2013.01); *H04W 84/18* (2013.01)

(58) Field of Classification Search
None
See application file for complete search history.

(56) References Cited

U.S. PATENT DOCUMENTS

| 7,371,538 B2 | 5/2008 | Simpson et al. |
| 7,489,656 B2 * | 2/2009 | Guo et al. ............. 370/329 |
| 8,571,003 B2 * | 10/2013 | Guo et al. ............. 370/347 |
| 2002/0067736 A1 | 6/2002 | Garcia-Luna-Aceves et al. |
| 2003/0063619 A1 * | 4/2003 | Montano et al. ............. 370/443 |
| 2004/0053621 A1 | 3/2004 | Sugaya |
| 2004/0109571 A1 | 6/2004 | Yoshimine |

(Continued)

FOREIGN PATENT DOCUMENTS

| CN | 1 586 056 | 2/2005 |
| CN | 101223794 | 7/2008 |

(Continued)

OTHER PUBLICATIONS

Korean Office Action dated Feb. 2, 2015 issued in counterpart application No. 10-2009-0063754.

*Primary Examiner* — Timothy J Weidner
(74) *Attorney, Agent, or Firm* — The Farrell Law Firm, P.C.

(57) ABSTRACT

Short range wireless communication is provided. A first node included in a Wireless Body Area Network (WBAN) communicates with at least one neighboring second node. The first node transmits or receives data to or from at least one device node connected to the first node during a time division communication period, using a super-frame in which the time division communication period, a time division schedule advertisement message transmission period, and a Contention Access Period (CAP) are sequentially arranged. The first node broadcasts a time division schedule advertisement message of the first node to the at least one second node during the time division schedule advertisement message transmission period within the super-frame. Upon receiving a time division schedule advertisement message from the second node during the CAP within the super-frame, the first node adjusts a data transmission or reception time for the at least one device node connected to the first node using the received time division schedule advertisement message.

28 Claims, 11 Drawing Sheets

(56) References Cited

U.S. PATENT DOCUMENTS

| | | |
|---|---|---|
| 2006/0133404 A1 | 6/2006 | Zuniga et al. |
| 2007/0174465 A1* | 7/2007 | Huang et al. .................. 709/227 |
| 2007/0218921 A1* | 9/2007 | Lee et al. .................... 455/456.1 |
| 2007/0230497 A1* | 10/2007 | Choi et al. .................... 370/442 |
| 2007/0248114 A1 | 10/2007 | Jia et al. |
| 2008/0123619 A1* | 5/2008 | Ko et al. ....................... 370/345 |
| 2008/0181157 A1* | 7/2008 | Aoki .............................. 370/311 |
| 2008/0253328 A1 | 10/2008 | Sahinoglu et al. |
| 2009/0028090 A1 | 1/2009 | Sim et al. |
| 2009/0046675 A1 | 2/2009 | Pratt, Jr. et al. |
| 2009/0067389 A1* | 3/2009 | Lee et al. ...................... 370/336 |
| 2009/0238160 A1* | 9/2009 | Bhatti et al. .................. 370/338 |
| 2010/0118737 A1* | 5/2010 | Kim et al. ..................... 370/254 |
| 2010/0195601 A1* | 8/2010 | Zhang ........................... 370/329 |

FOREIGN PATENT DOCUMENTS

| | | |
|---|---|---|
| JP | 2004-040645 | 2/2004 |
| JP | 2006-173891 | 6/2006 |
| JP | 2008-289135 | 11/2008 |
| JP | 2009-010553 | 1/2009 |
| KR | 1020010032491 | 4/2001 |
| KR | 1020090009888 | 1/2009 |
| RU | 2 299 673 | 5/2007 |
| RU | 2 314 744 | 1/2008 |
| WO | WO 2005/043829 | 5/2005 |

* cited by examiner

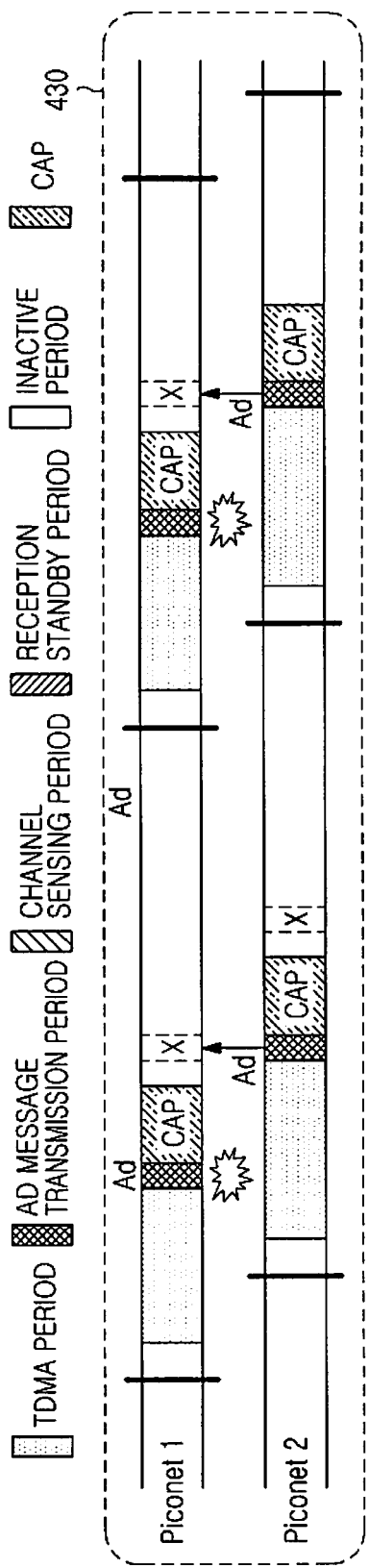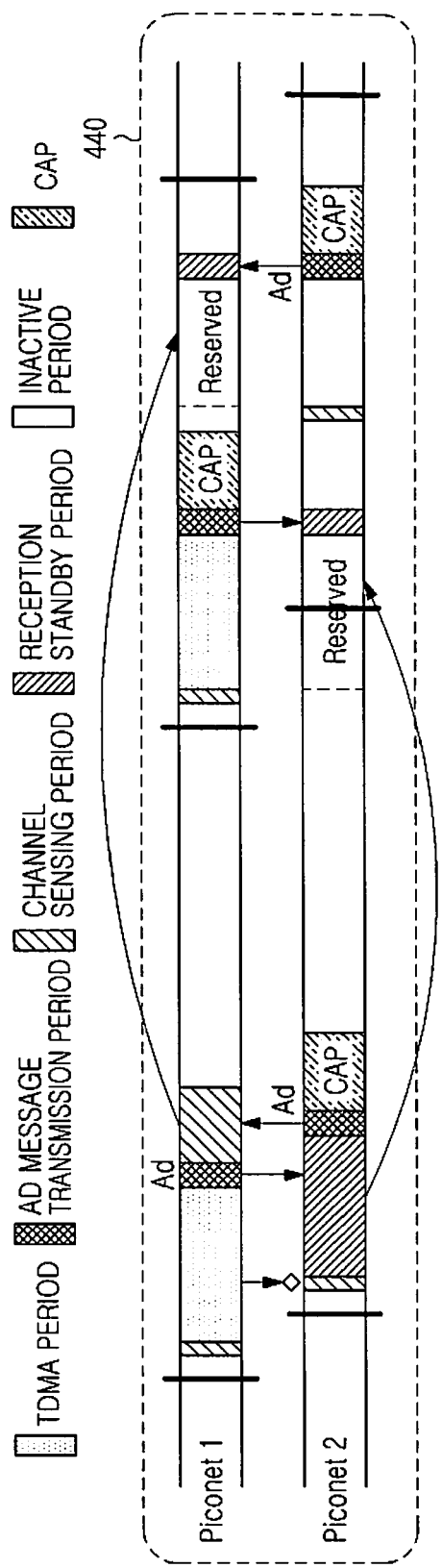
FIG.6A
FIG.6B

COMMUNICATION METHOD AND APPARATUS IN WIRELESS BODY AREA NETWORK

PRIORITY

This application claims priority under 35 U.S.C. §119(a) to a Korean Patent Application filed in the Korean Intellectual Property Office on Jul. 13, 2009 and assigned Serial No. 10-2009-0063754, the entire disclosure of which is hereby incorporated by reference.

BACKGROUND OF THE INVENTION

1. Field of the Invention

The present invention relates generally to short-range wireless communication, and more particularly, to a communication method and apparatus for the coexistence of a plurality of piconets in a Wireless Body Area Network (WBAN) environment.

2. Description of the Related Art

WBAN refers to specific short-range wireless communication which is progressing towards the international standard IEEE (Institute of Electrical and Electronic Engineers) 802.15.6 TG6 BAN. WBAN can be used in medical services, such as remote health care, and entertainment services for wearable computing or using motion sensors, through a communication network in a body area within about three meters.

In WBAN, each individual constitutes one network, referred to as a "piconet". The piconet may be comprised of one coordinator node and a plurality of device nodes. The coordinator node may be a mobile phone and the device nodes may be a variety of personal devices attached to a human body. WBAN acts similar to a sensor network, and thus is prone to the "collision problem" caused by interference between a plurality of piconets when many people are present in a restricted space or while people move. Accordingly, a design of a specialized Medium Access Control (MAC) protocol for WBAN is demanded.

To design the specialized MAC protocol for WBAN, Carrier Sense Multiple Access (CSMA) and Time Division Multiple Access (TDMA) may be considered.

CSMA does not require time synchronization between nodes and shows a high channel utilization ratio and a low delay in a low contention environment. However, in a high contention environment (in which the number of nodes within an interference range is increased), performance deterioration occurs due to an increase in collisions and an increase in unpredictable delay caused by backoff. Therefore, it is difficult to apply CSMA to a WBAN when a plurality of piconets are present in a narrow space, and a real-time response is required.

TDMA has the advantages of a high channel utilization ratio, fewer collisions, and no unpredictable delay in a high contention environment but has the problem of overhead caused by time synchronization. Generally, TDMA requires a reference node for time synchronization, that is, a time synchronization root and consumes much time and energy for time synchronization when a node enters a new node or moves.

Accordingly, studies are needed in WBAN on a MAC protocol in a convergence form of CSMA and TDMA, which can overcome the disadvantages of the two schemes.

SUMMARY OF THE INVENTION

An aspect of the present invention is to address at least the above-mentioned problems and/or disadvantages and to provide at least the advantages described below. Accordingly, an aspect of the present invention provides a communication method and apparatus which are capable of offering a high channel utilization ratio in a high contention environment of a WBAN.

Another aspect of the present invention provides a communication method and apparatus which are capable of reducing data transmission collision when a plurality of piconets are adjacent to each other in a WBAN.

Another aspect of the present invention provides a communication method and apparatus which are capable of lowering a data transmission delay when a plurality of piconets are adjacent to each other in a WBAN.

Another aspect of the present invention provides a communication method and apparatus which are capable of reducing overhead caused by time synchronization during TDMA data transmission even in an environment in which a plurality of piconets are adjacent to each other in a WBAN.

In accordance with an aspect of certain embodiments of the present invention, a communication method in which a first node included in a WBAN communicates with at least one neighboring second node includes transmitting or receiving data to or from at least one device node connected to the first node during a time division communication period, using a super-frame in which the time division communication period, a time division schedule advertisement message transmission period, and a Contention Access Period (CAP) are sequentially arranged, broadcasting a time division schedule advertisement message of the first node to the at least one second node during the time division schedule advertisement message transmission period within the super-frame, and upon receiving a time division schedule advertisement message from the second node during the CAP within the super-frame, adjusting a data transmission or reception time for the at least one device node connected to the first node using the received time division schedule advertisement message.

BRIEF DESCRIPTION OF THE DRAWINGS

The above and other aspects, features and advantages of certain embodiments of the present invention will be more apparent from the following description taken in conjunction with the accompanying drawings, in which:

FIGS. 6A, 6B, 7, 8, and 9 are diagrams illustrating frame structures according to embodiments of the present invention.

Throughout the drawings, the same drawing reference numerals will be understood to refer to the same elements, features and structures.

DETAILED DESCRIPTION OF THE PRESENT INVENTION

Figure 1:
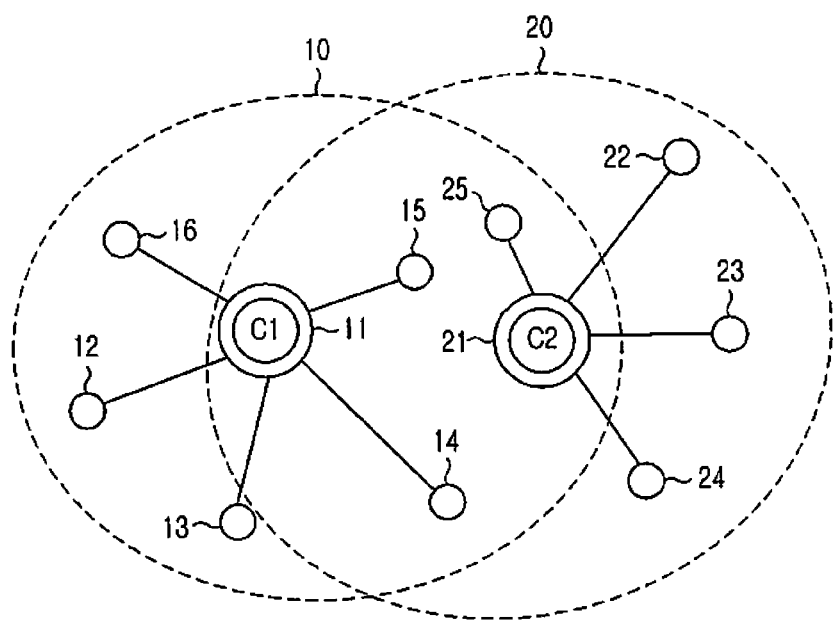
FIG. 1 is a diagram illustrating a piconet structure according to an embodiment of the present invention.

Reference will now be made in detail to the embodiments of the present invention with reference to the accompanying drawings. The following detailed description includes specific details in order to provide a thorough understanding of the present invention. However, it will be apparent to those skilled in the art that the present invention may be practiced without such specific details.

According to the present invention, a WBAN is comprised of a plurality of wireless communication nodes designed for mobility. The wireless communication node (hereinafter, referred to as "node") may be, for example, a mobile communication terminal, a notebook computer, a Personal Digital Assistant (PDA), or a sensor node, but are not limited thereto. The sensor node refers to a device having sensing and communication functions necessary to observe a physical phenomenon. The sensor node is a basic element constituting a wireless sensor network and may be a smart dust, for example. The sensor node may also be a medical device inserted into a human body. The wireless communication node may operate as one independent node or may be included as a master node or a dependent node in a very small area network, that is, a piconet, comprised of a master node and one or more slave nodes to the master node. Since the independent node may be considered as a master node without any dependent node, hereinafter the master node may be interpreted as including an independent node without any dependent node. The WBAN may repeat separation, integration, or modification while independent nodes or piconets move. Hereinafter, a node corresponding to a master node will be referred to as a coordinator node and a node corresponding to a dependent node will be referred to as a device node.

The coordinator node can directly communicate with dependent nodes or another coordinator node within a certain communication range. In the above two cases, CSMA and TDMA schemes may both be used according to a method of the present invention. It is favorable to use TDMA with respect to traffic which is regularly generated and is sensitive to a transmission delay, and to use CSMA with respect to traffic which is irregularly generated and is insensitive to a transmission delay.

In accordance with an embodiment of the present invention, TDMA transmission scheduling may be performed by the exchange of information between coordinator nodes, and it is desirable for a dependent node to operate according to the commands of one coordinator node in synchronization with another coordinator node.

In the case where the dependent node requires a time slot for TDMA communication, if the dependent node requests the coordinator node to allocate the time slot, the coordinator node determines the requested time slot in consideration of time slots used by neighboring coordinator nodes or independent nodes, notifies nodes within a prescribed range of the allocation of the time slot, and allocates the time slot to the dependent node. In the following description, a node refers to an independent node, or a coordinator node belonging to one piconet.

If the physical space occupied by a piconet is so wide that there is a big difference between an interference range of a coordinator node and an interference range of a dependent node the dependent node may operate like an independent node, since the coordinator node cannot perform slot reservation.

The present invention provides a distributed TDMA MAC protocol which is a MAC protocol of a CSMA/TDMA convergence scheme supporting mobility of a node and interference avoidance between piconets. Such a distributed TDMA scheme avoids interference through the exchange of a control message and enables communication even though time synchronization is not established between a plurality of piconets. In the distributed TDMA scheme, all nodes do not always adjust time synchronization based on a specific node's timer and each node confirms the time slot scheduling of other nodes while maintaining its own time reference.

Next, each coordinator node calculates a time difference between its timer and another coordinator node's timer, applies the calculated time difference to a time value received from a coordinator node of a neighboring piconet, and changes the received time value to a time value based on its timer, thereby exchanging information about the other's time without a single explicit time reference.

In other words, in the distributed TDMA scheme, a coordinator node receives time slot information of a neighboring coordinator node from a coordinator node of a neighboring piconet, calculates a time offset between its timer and a neighboring coordinator node's timer using the time slot information, and changes a time value of a time slot which is reserved or used by the neighboring coordinator node to a time value based on its timer, using the calculated time offset. Accordingly, the coordinator node can accurately confirm a time slot period designated for the neighboring coordinator node without a synchronization process for a specific reference time and can designate a time slot period which is to be used by itself.

To this end, a coordinator node includes a timetable for storing its or another node's time slot information and neighboring coordinator nodes exchange a control message called a TDMA schedule advertisement message (hereinafter, referred to as an "AD message") in order to exchange their time slot information. If it is determined through the exchange of the AD message that a transmission time of a coordinator node in a TDMA period overlaps a transmission time of a neighboring piconet, the coordinator node changes the data transmission period to a non-overlapping period within a super-frame, thereby avoiding interference.

FIG. 1 illustrates an example of a plurality of piconets in a WBAN to which the distributed TDMA scheme is applied. In FIG. 1, there is shown a first piconet 10 and a second piconet 20 which are adjacent to each other. The first piconet 10 is comprised of a coordinator node 11 and a plurality of device nodes 12, 13, 14, 15, and 16. The second piconet 20 is comprised of a coordinator node 21 and a plurality of device nodes 22, 23, 24, and 25.

Figure 2:
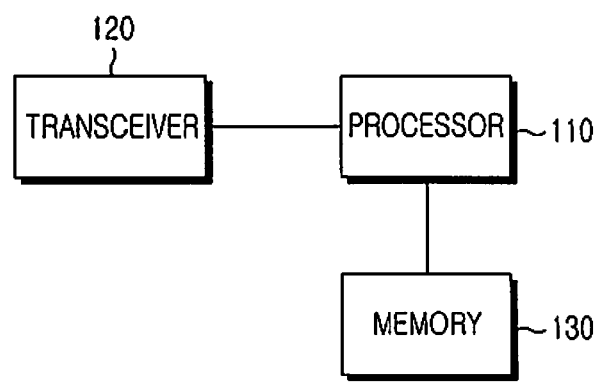
FIG. 2 is a block diagram illustrating a structure of a network device according to an embodiment of the present invention.

An example of a configuration of a network device included in each of the coordinator nodes 11 and 12 is shown in FIG. 2. The network device according to an embodiment of the present invention includes a processor 110, a transceiver 120, and a memory 130.

The processor 110 controls the transceiver 120 and the memory 130 according to a communication operation of a node in a WBAN. The processor 110 includes a timer for counting time.

The transceiver 120 transmits or receives data through a communication link formed between nodes under the control of the processor 110 and processes the transmitted and received data.

The memory 130 stores information necessary for a node to communicate in the WBAN and stores time slot information for TDMA communication. The time slot information includes information about a time slot of the node and information about a time slot of each of neighboring nodes. According to an embodiment of the present invention, the time slot information is stored in the form of a timetable.

According to an embodiment the present invention, the processor 110 broadcasts the time slot information stored in the memory 130 through the transceiver 120, and upon receiving time slot information from a neighboring node, the processor 110 calculates a time offset between its timer and a neighboring node's timer using the time slot information of the neighboring node. The processor 110 then corrects a time value included in the time slot information received from the neighboring node to a time value based on its timer using the calculated time offset. In this case, the length of a time slot is not corrected.

The time slot information indicates information about a time slot which is allocated or is being used by the node to transmit and receive data by TDMA. The time slot information includes identification information of the node, and start time and length information of each time slot designated in correspondence to the node in one frame. An entry stored in the timetable indicating the time slot information is listed below in Table 1.

TABLE 1

| Node Address | Number of Hops | Time Offset | Time Slot Start Time | Time Slot Length | Version Information | Contention Access Period Information |
| --- | --- | --- | --- | --- | --- | --- |

Each entry in the timetable corresponds to a time slot designated to an arbitrary node. If one node uses a plurality of split time slots, a plurality of entries with respect to the same node may be included in one table. In Table 1, Node Address indicates an address of a node which has reserved the slot to represent which node the entry indicates and may be used as identification information of the node. Number of Hops indicates how many hops a neighboring node is separated from the node, and the number of hops of the node is 0. Time Offset indicates a time difference between the node's timer and a neighboring node's timer. Time Slot Start Time represents when the time slot corresponding to the entry is started based on a start point of a frame. Time Slot Length indicates the length of the time slot, that is, a time period. Version Information denotes an updated degree of information and indicates how recently the entry information has been updated. Contention Access Period (CAP) Information indicates information about a CAP set to the node and denotes a start point and length of the CAP.

When a coordinator node is first booted up, the above-described timetable does not include any entries. However, if the coordinator node receives time slot information from another node or reserves a time slot after booting, the processor 110 generates a table entry corresponding thereto. Namely, the entry of the time slot table includes information about a time slot which is to be used by the node. If the entry of the time slot table is generated, the processor 110 repeatedly broadcasts time slot information corresponding to the contents of the current time slot table periodically or randomly.

Figure 3:
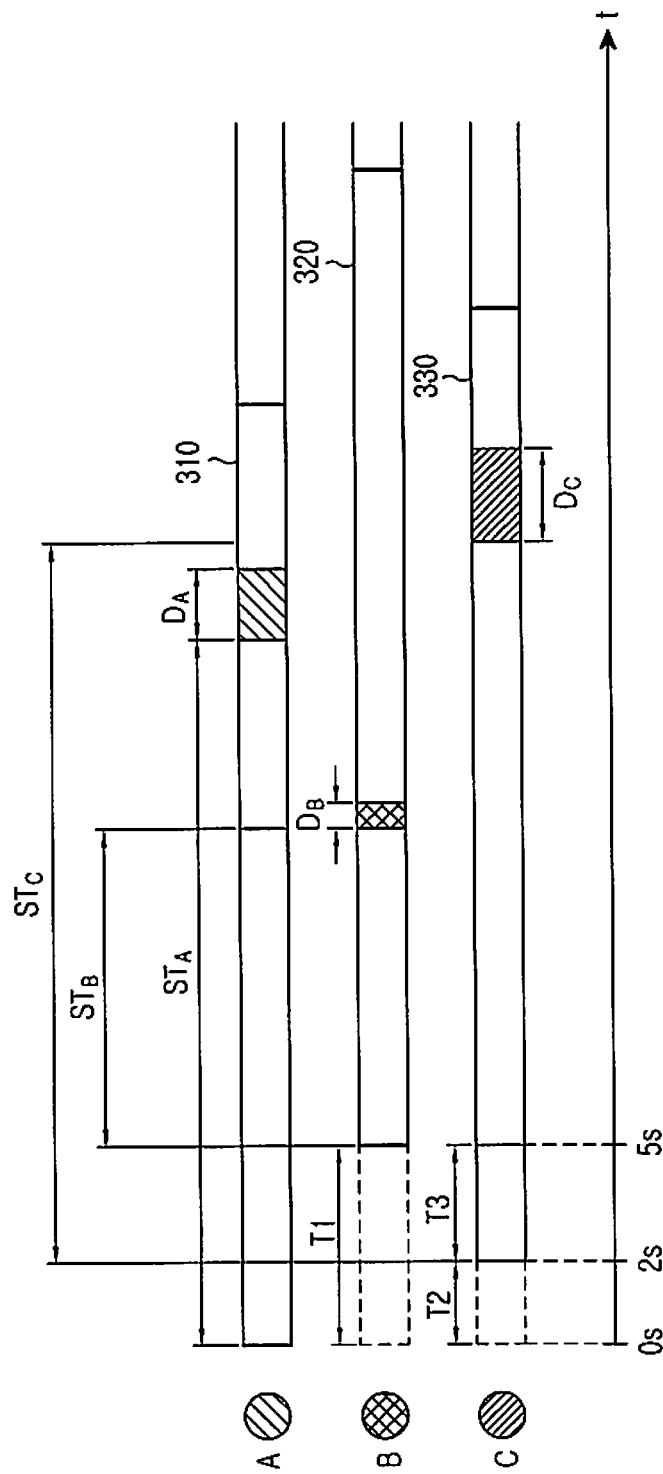
FIG. 3 is a diagram illustrating a timetable updating process according to an embodiment of the present invention.
Figure 4:
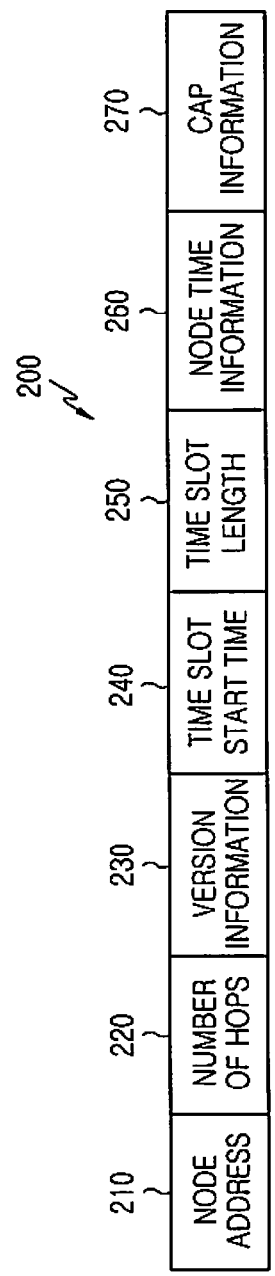
FIG. 4 is a diagram illustrating a configuration of an AD message according to an embodiment of the present invention.

The configuration, updating and storing processes of the time slot table will now be described with reference to FIGS. 3 and 4. In FIG. 3, three coordinator nodes, A, B, and C are coordinator nodes of a plurality of piconets. Super-frames 310, 320, and 330 correspond to the coordinator nodes A, B, and C, respectively.

Each of the coordinator nodes A, B, and C include the network device shown in FIG. 2. Each coordinator node has a TDMA transmission period at an arbitrary location within its super-frame. Within the TDMA transmission period, each coordinator node performs scheduling for a data transmission period with respect to each device node. The other periods except for the TDMA transmission period use CSMA. The coordinator nodes A, B, and C may be connected to each other by one hop.

In FIG. 3, time slot periods occupied by the coordinator nodes A, B, and C in the super-frames 310, 320, and 330 are denoted by the same patterns as the patterns expressing the coordinator nodes A, B, and C. The super-frames 310, 320, and 330 are started in the respective nodes at time points scheduled between the nodes. In other words, the periods of super-frames for TDMA communication are the same in all nodes and the start times of the super-frames are also the same in the nodes. For example, if the period of the super-frame is 10 seconds, the start time of the super-frame may be 0, 10, 20, 30, 40, or 50 seconds of every minute based on a timer of each node. If timers of all nodes start counting based on the same time, it is not necessary to perform time synchronization between nodes. However, since timers of nodes may start counting based on different times, a time difference between the timers of the nodes may occur. Namely, even though the super-frames are started at a determined time, the start times of the super-frames of respective nodes may be substantially different.

In FIG. 3, the super-frames 310, 320, and 330 corresponding to the coordinator nodes A, B, and C have substantially different start times. That is, timers of the coordinator nodes A, B, and C have different time references. The start times of time slots in the respective coordinator nodes are $ST_A$, $ST_B$, $ST_C$ based on the start times of the respective super-frames, and the lengths of the time slots are $D_A$, $D_B$, $D_C$. The super-frame structure shown in FIG. 3 is a structure for explaining the configuration of the timetable.

If each coordinator node receives time slot information from another coordinator node after it has booted up or reserves a time slot, which is to be used by itself, the coordinator node generates the timetable. The coordinator node then configures and broadcasts an AD message including entry information of Table 1, thereby broadcasting time slot information. An example of the AD message is illustrated in FIG. 4. Referring to FIG. 4, an AD message 200 includes a node address 210, the number of hops 220, version information 230, a time slot start time 240, a time slot length 250, node time information 260, and CAP information 270. The CAP information 270 included in the AD message 200 includes start time information and length information relating to a CAP which is to be set first after the transmission of the AD message 200. The time slot start time 240 and the time slot length 250 indicate information about a time period which is to be used in the node.

The node time information 260 indicates information about a timer value used in a node which has transmitted the AD message 200 and is used when calculating a time offset between nodes. The timer value included in the node time information 260 is determined based on a timer value of a time point at which the AD message 200 is transmitted. Although an example in which the node time information 260 is included in the AD message 200 for transmission has been described, the node time information 260 may be broadcast as an additional message.

Referring to FIG. 3, in the time slot tables of the coordinator nodes B and C, time offsets with respect to the coordinator node A are −T1 and −T2, respectively. These time offsets are calculated using the node time information 260 with respect to the node A, included in the AD message 200.

In more detail, a time offset is a value obtained by subtracting a timer value of a node which transmits a message from a timer value derived based on a time point of receiving the message by another node. For example, if a transmitting time of the AD message 200 is used as the node time information, time offset values of nodes B and C are obtained by subtracting the transmitting time of the AD message from receiving times of the AD message by nodes B and C. Therefore, in the time slot table of node B, a timer value of the node B is obtained by adding the time offset−T1 with respect to node A to a timer value of node A at an arbitrary time point.

The coordinator nodes A, B, and C store timetables as shown in Tables 2, 3, and 4 by transmitting and receiving the AD message 200. That is, Tables 2, 3, and 4 show the timetables of the coordinator nodes A, B, and C, respectively.

TABLE 2

| Node Address | Number of Hops | Time Offset | Time Slot Start Time | Time Slot Length | Version Information | CAP Information |
|---|---|---|---|---|---|---|
| A | 0 | 0 | $ST_A$ | $D_A$ | 1 | $CAP_A$ |
| B | 1 | T1 | $ST_B + T1$ | $D_B$ | 1 | $CAP_B$ |
| C | I | T2 | $ST_C + T2$ | $D_C$ | 1 | $CAP_C$ |

TABLE 3

| Node Address | Number of Hops | Time Offset | Time Slot Start Time | Time Slot Length | Version Information | CAP Information |
|---|---|---|---|---|---|---|
| A | 1 | −T1 | $ST_A - T1$ | $D_A$ | 1 | $CAP_A$ |
| B | 0 | 0 | $ST_B$ | $D_B$ | 1 | $CAP_B$ |
| C | 1 | −T3 | $ST_C - T3$ | $D_C$ | 1 | $CAP_C$ |

TABLE 4

| Node Address | Number of Hops | Time Offset | Time Slot Start Time | Time Slot Length | Version Information | CAP Information |
|---|---|---|---|---|---|---|
| A | 1 | −T2 | $ST_A - T2$ | $D_A$ | 1 | $CAP_A$ |
| B | 1 | T3 | $ST_B + T3$ | $D_B$ | 1 | $CAP_B$ |
| C | 0 | 0 | $ST_C$ | $D_C$ | 1 | $CAP_C$ |

It is important to configure and update the timetables because coordinator nodes schedule TDMA time slots using the timetables.

The AD message 200 transmitted and received to configure and update the timetable may be periodically broadcast or randomly broadcast as part of a beacon.

If the AD message is included in the beacon for transmission, a coordinator node of a piconet should always maintain an active state. Accordingly, the transceiver 120 of the coordinator node is always in a reception standby state. However, since the reception standby state consumes power similar to that consumed during packet transmission, the power life span of the coordinator node will be shortened. If the coordinator node is turned off due to the consumption of energy, the entire piconet cannot communicate.

Moreover, if an unrecognized piconet group accesses a coordinator node, the coordinator node should be able to avoid initial collision. A distributed TDMA scheme avoids collision by rearranging the TDMA periods through the exchange of the AD message 200 when TDMA periods are overlapped. If the TDMA periods are overlapped prior to rearrangement of the TDMA periods, collision may occur and energy may be wasted due to the need for retransmission.

Figure 5:
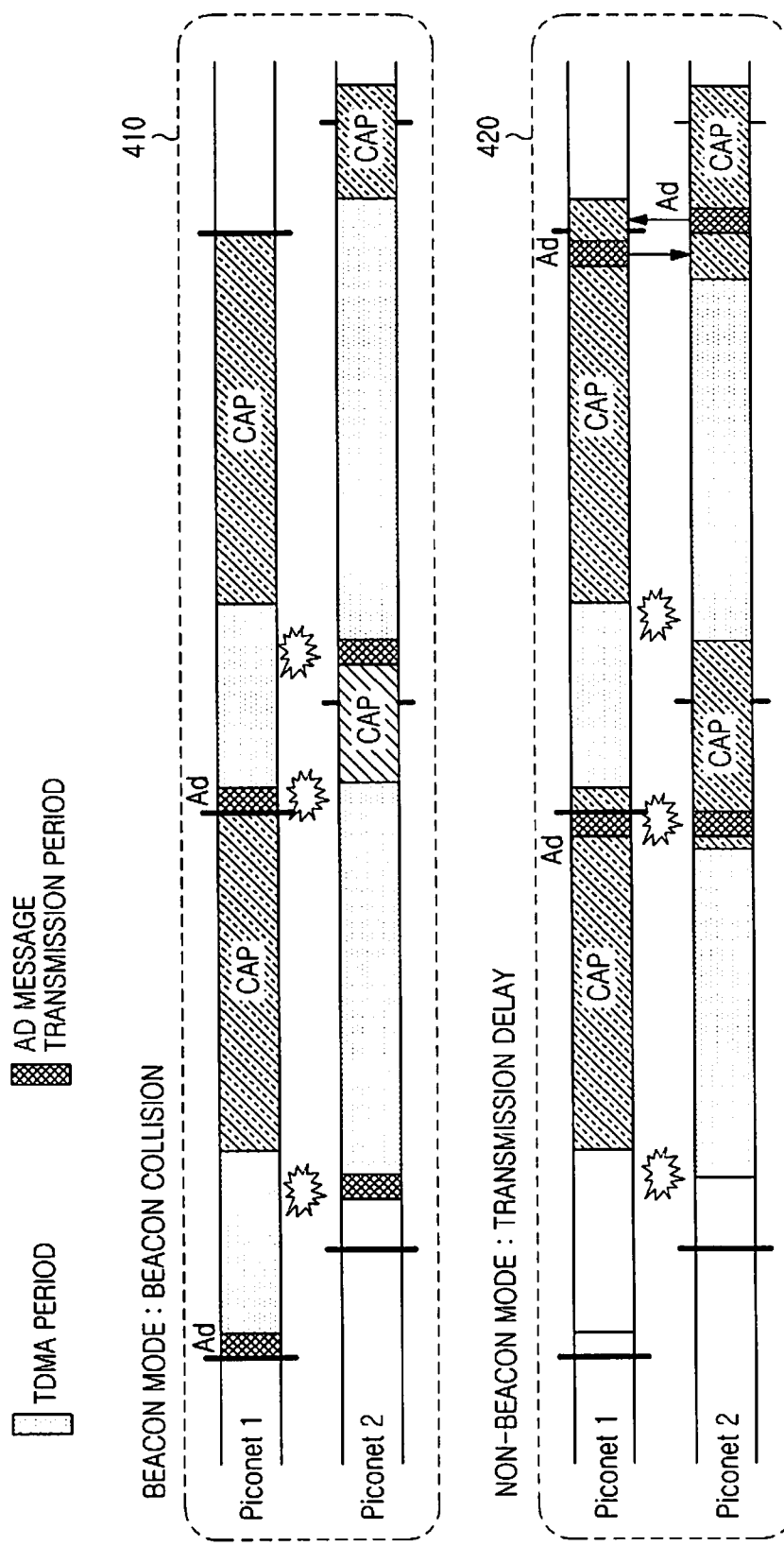
FIG. 5 is a diagram illustrating an example of a data collision.

An example of a collision is shown in FIG. 5. In FIG. 5, reference number 410 designates a situation where the first piconet 10 and the second piconet 20 operate in a beacon mode. In situation 410, the AD message 200 is broadcast as part of the beacon. The AD message 200 is transmitted during TDMA periods of the first and second piconets 10 and 20. Then collision occurs and lost data cannot be restored.

Reference number 420 designates a situation where the first piconet 10 and the second piconet 20 operate in a non-beacon mode. In a distributed TDMA scheme, the AD message is transmitted during a CAP in CSMA/Collision Avoidance (CA). If the CAP overlaps a TDMA period of a neighboring piconet, the AD message cannot be transmitted until the TDMA period has ended, thereby causing an undesired delay. In the distributed TDMA scheme, if a coordinator node switches to an inactive mode in order to reduce power consumption, the coordinator node cannot receive the AD message 200 of a neighboring coordinator node.

Accordingly, it is desirable to transmit and receive the AD message such that a coordinator node can set an active period and an inactive period if necessary. Further, a method is needed for successfully exchanging the AD message at a proper time even in a case where a super-frame is in the non-beacon mode, such as a "polling access" mode proposed for the IEEE 802.15.6 BAN standard.

According to the present invention, a piconet includes an active period and an inactive period as described previously, and a super-frame structure as listed below in Table 5 is provided in order to transmit and receive data without collision or delay by successfully transmitting and receiving the AD message irrespective of whether a beacon mode or a non-beacon mode is set.

TABLE 5

| Channel Sensing Period | TDMA Period | AD Message Transmission Period | CAP | Channel Sensing Period |
|---|---|---|---|---|

In the super-frame structure of the present invention for sensing collisions between piconets, a channel sensing period is arranged at a first start time and a last end time as shown in Table 5, and an AD message transmission period during which the AD message is broadcast is arranged after a TDMA period. After broadcasting the AD message, a CAP is always set, and after the CAP, the channel sensing period is set.

The channel sensing period refers to a period for confirming whether there is a piconet using a communication channel. During the channel sensing period, the transceiver 120 of a coordinator node confirms whether a signal having an intensity above a predetermined value is received in a frequency band used by the WBAN. In this case, coding is not performed upon the received signal. If a signal having an intensity above a predetermined value is received, this means that there is another piconet which is transmitting and receiving data in an adjacent location. If it is difficult to sense a channel by the above-described method, the number of packets which are lost due to collision may be sensed to replace channel sensing. In the present invention, channel sensing is described but other methods may be used to confirm whether collision with a neighboring piconet occurs. For example, it may be determined whether a neighboring channel is used by confirming a degree of loss using a dummy packet during the channel sensing period. If successive packet errors are detected during the transmission of a dummy packet or a preamble error is detected, it is determined that a piconet collision is expected. Alternatively, the presence or absence of a channel may be determined according to a measured Signal-to-Noise Ratio (SNR). Namely, if an SNR is above a predetermined reference value, it may be determined that there is a neighboring piconet which is transmitting and receiving data.

The super-frame structure of the present invention includes the AD message transmission period after the TDMA period in order to exchange information between coordinator nodes and includes a CAP after the AD message transmission period, thereby solving problems when a collision is sensed. The AD message period is present between the TDMA period and the CAP in order to enable a coordinator node to receive the AD message of an arbitrary coordinator node from the arbitrary coordinator node which has received an AD message broadcast by the coordinator node during the CAP. That is, the arbitrary coordinator node can confirm the CAP included in the AD message of the coordinator node after receiving the AD message and can transmit its AD message during the confirmed CAP. Since the super-frame structure of the present invention includes the CAP immediately after the AD message transmission period, the arbitrary coordinator node can transmit its AD message within the same transmission period after receiving the AD message of the coordinator node.

If the AD message is included for transmission in the beacon as in situation 410 of FIG. 5, since a specific coordinator node transmits and receives data during the TDMA period immediately after transmitting the AD message, a neighboring coordinator node which has received the AD message of the specific coordinator node can transmit its AD message after the TDMA period of the specific coordinator node has ended. Accordingly, other coordinator nodes may transmit their AD messages after the next transmission period or may not transmit their AD messages even during the next period. In this way, a plurality of coordinator nodes cannot smoothly transmit and receive the AD message, and a transmission delay may occur in any one coordinator node or frequent data collisions may occur. In particular, in a WBAN, since a data transmission period may be increased due to its characteristic, it is desirable to transmit and receive the AD message within one period in order to prevent the loss of important information.

As another example, even when the CAP follows the TDMA period and the AD message is transmitted after the CAP has ended, as in situation 420 of FIG. 5, since there is no period during which data can be received from other coordinator nodes, problems similar to those generated in situation 410 may occur.

However, in the super-frame structure of the present invention, since the TDMA period is followed by the AD message transmission period and thereafter by the CAP, the above-mentioned problems can be solved.

The AD message 200 is a type of broadcasting message and therefore is transmitted with a known broadcasting recognition code without designating a specific node.

Table 5 shows a basic super-frame structure. The super-frame structure may be modified according to an operating process of the present invention. For example, the super-frame structure may be comprised of a TDMA period, an AD message transmission period, and CAP without a channel sensing period as designated by situation 430 in FIG. 6A. Even in this case, the AD message can be smoothly transmitted and received between neighboring coordinator nodes as compared with conventional methods and therefore a channel collision can be effectively prevented.

However, a channel sensing interval may be added to accurately transmit and receive the AD message and to further reduce the occurrence of a channel collision.

Figure 8:
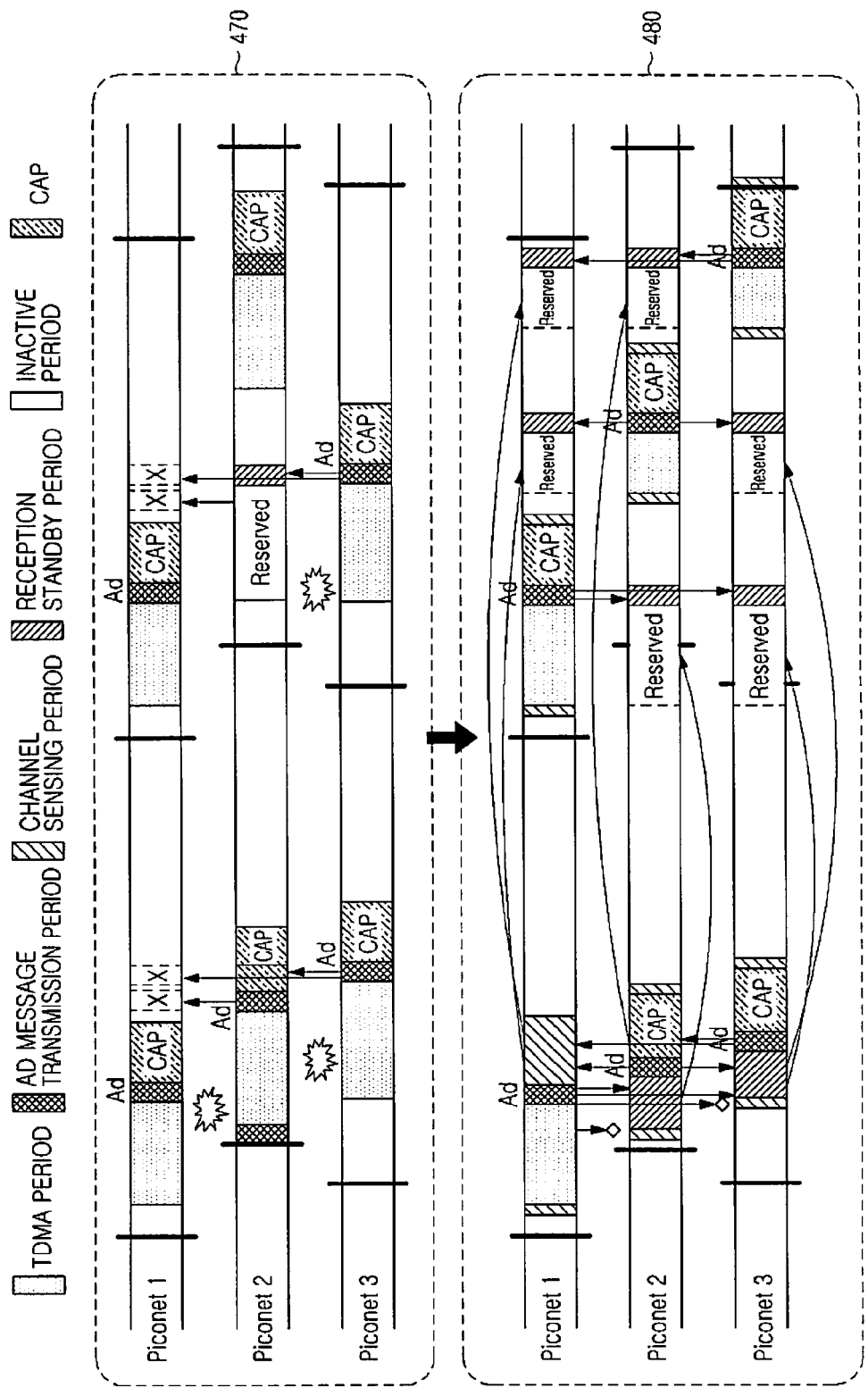
Figure 9:
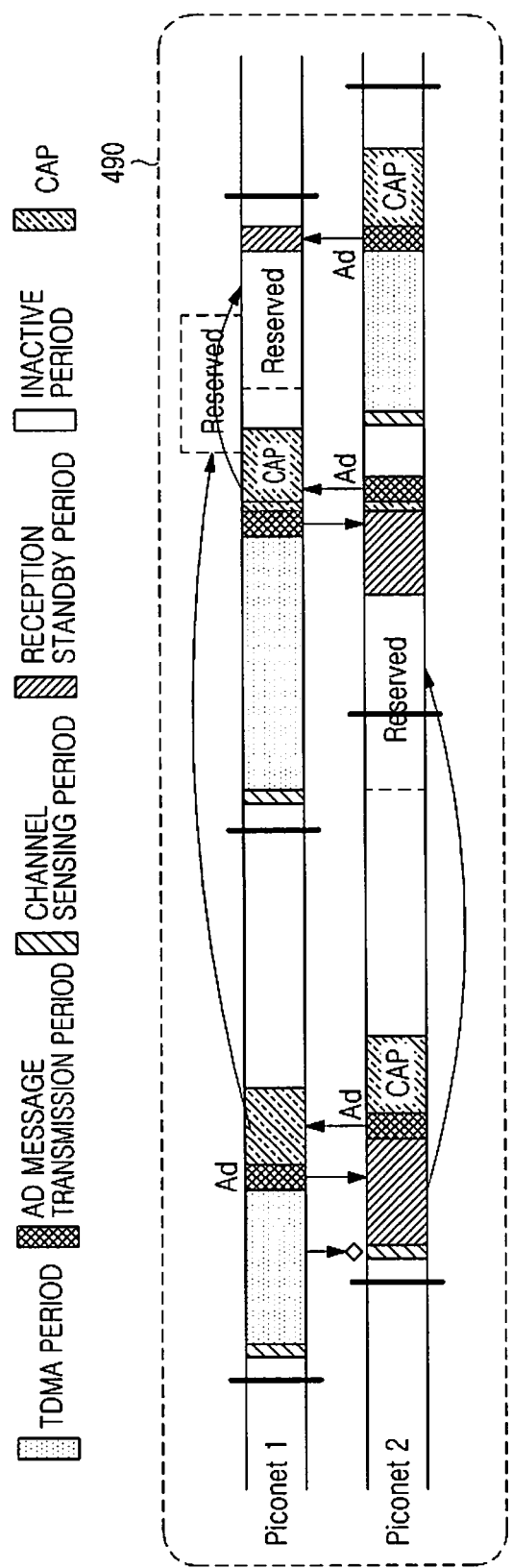
Figure 10A:
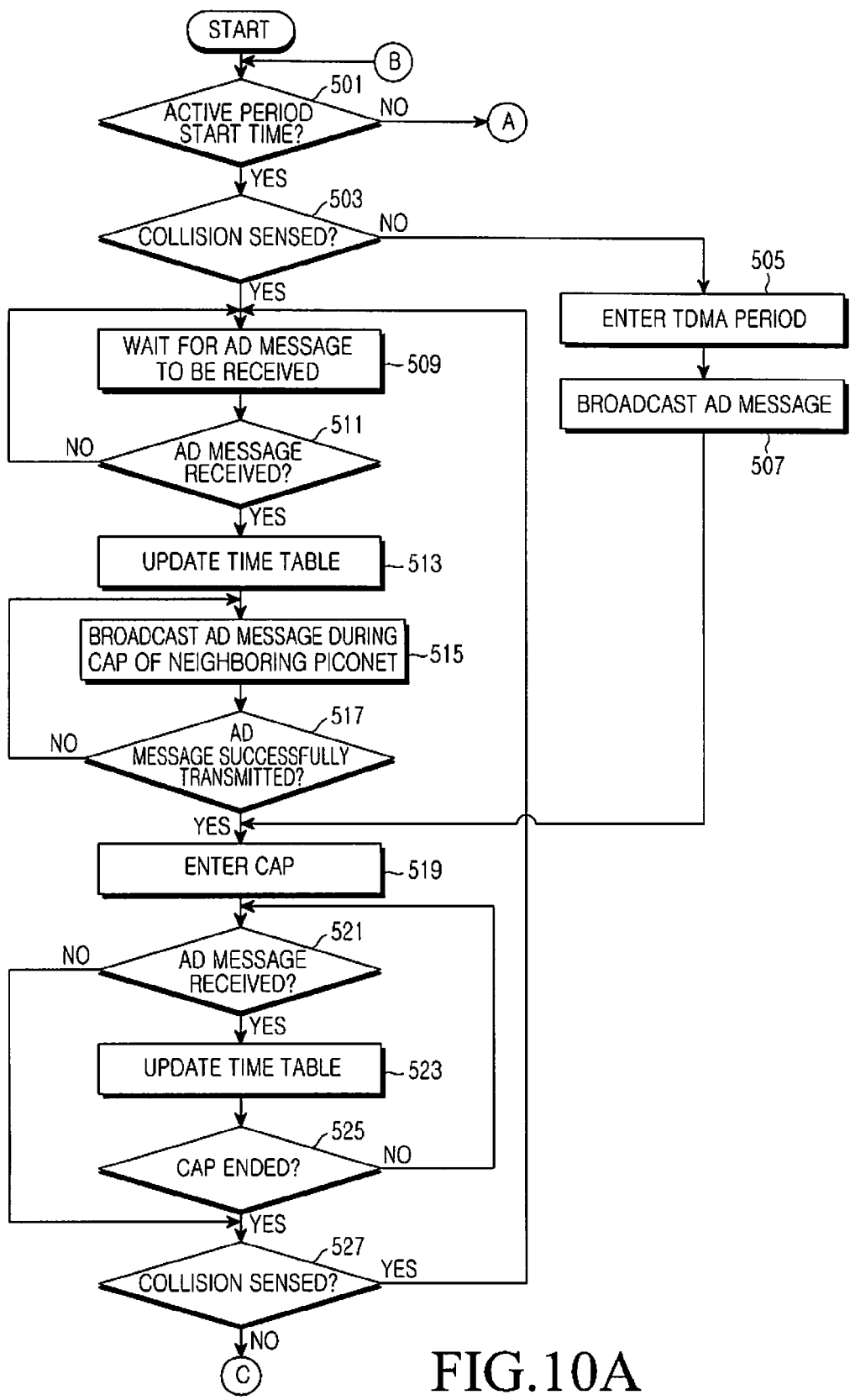
FIGS. 10A and 10B are flow charts illustrating an operating process of a coordinator node according to an embodiment of the present invention.
Figure 10B:
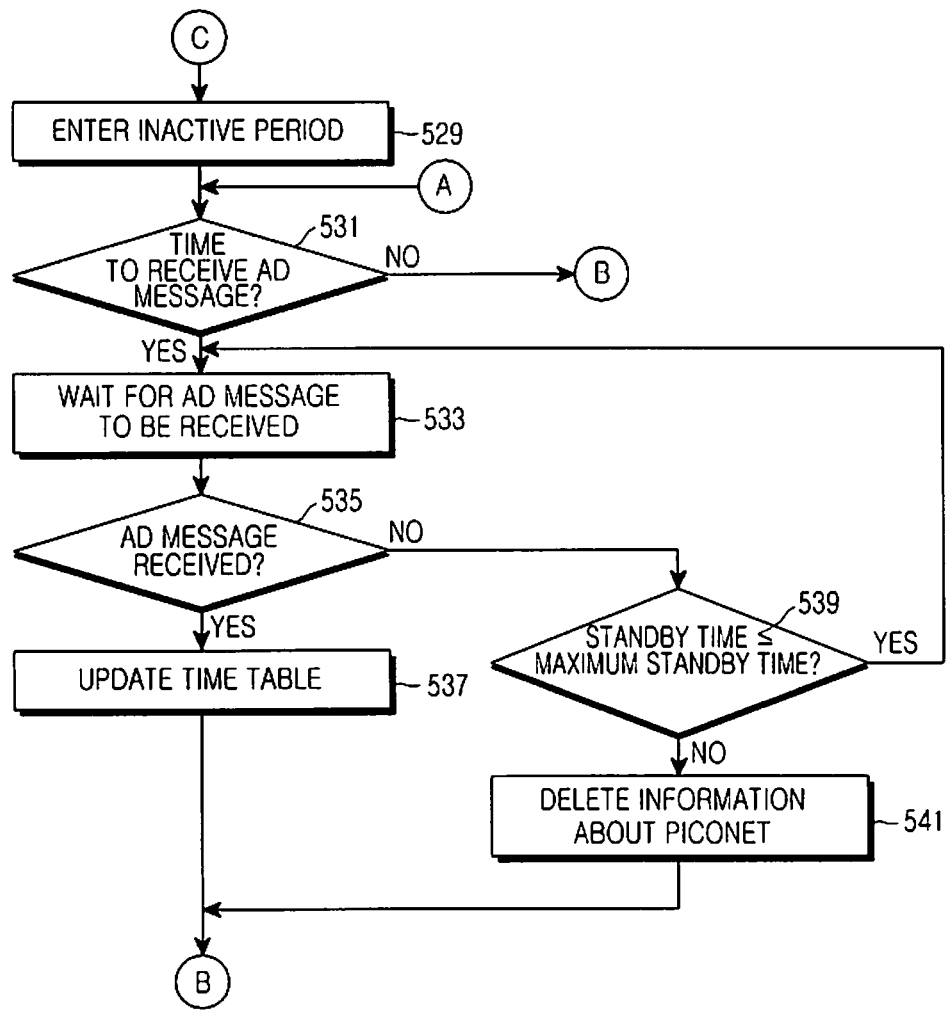

A process for transmitting the AD message using the above-described super-frame will now be described with reference to FIGS. 6A, 6B, 7, 8, 9, 10A, and 10B. FIGS. 6A, 6B, 7, 8, and 9 illustrate frame structures according to embodiments of the present invention. FIGS. 10A and 10B illustrate an operating process of a coordinator node performed by the processor 110 according to an embodiment of the present invention.

If two neighboring piconets use different time periods during data transmission, a data collision will not occur. In this case, an operating process of a coordinator node of each piconet is as follows.

Referring to FIGS. 10A and 10B, the processor 110 of a coordinator node confirms whether a current time point is an active period start time according to a predetermined schedule (step 501). If it is an active period start time, the processor 110 senses a channel through the transceiver 120 during a predetermined channel sensing period (step 503). Since two neighboring piconets use different time periods during data transmission, no channel is sensed during the channel sensing period, and thus no collision is sensed. Then the processor 110 of the coordinator node transmits data during the TDMA period and broadcasts the AD message 200 when the TDMA period has ended (steps 505 and 507). Next, the processor 110 enters a CAP (step 519) and confirms whether the AD message 200 is received during the CAP (step 521). If the AD message 200 is not received during the CAP, the processor 110 enters an inactive period (steps 527 and 529).

Figure 7:
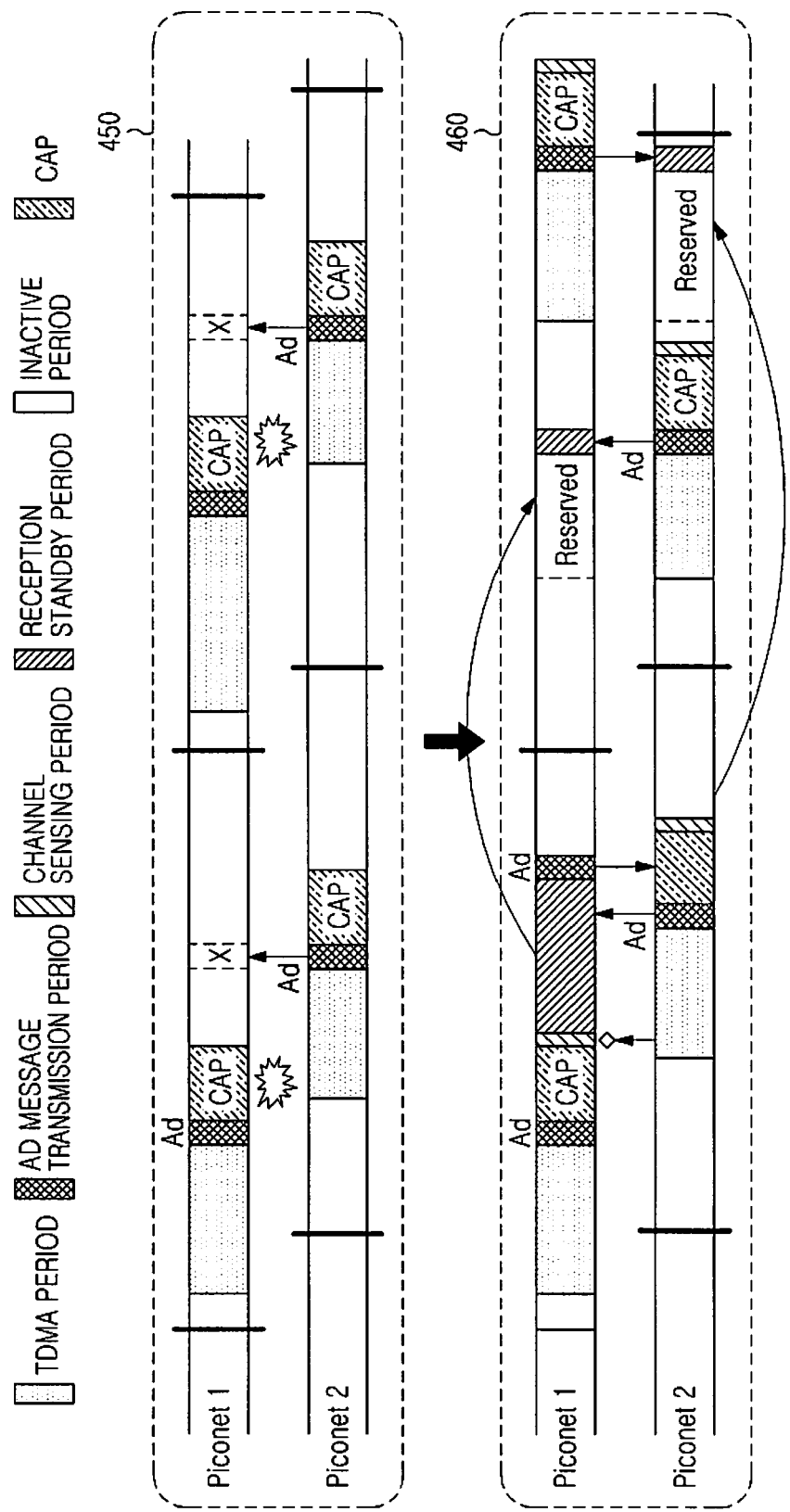

If two neighboring piconets share overlapping time periods during data transmission, a data collision will occur. FIGS. 6A, 6B, and 7 illustrate situations in which data collision occurs and a frame structure for solving a problem of data collision. FIGS. 6A and 6B illustrate the cases where a TDMA transmission period is overlapped and FIG. 7 illustrates the case where a CAP is overlapped with a TDMA period.

In FIG. 6A, there is shown situation 430 where the AD message 200 sent by the first piconet 10 collides in a TDMA period of the second piconet 20 and the coordinator node 21 of the second piconet 20 does not know a TDMA period of the first piconet 10. Since the first piconet 10 has already entered an inactive period, the AD message of the second piconet 20 is not transmitted and the coordinator node 11 of the first piconet 10 does not know the TDMA period of the second piconet 20.

Such a collision may be solved as in situation 440 of FIG. 6B. Since the coordinator node 11 of the first piconet 10 enters an active period and senses no channel during a channel sensing period, it determines that no collision is sensed and enters the TDMA period to transmit a packet (steps 501, 503, and 505 of FIG. 10A).

Meanwhile, referring back to FIG. 10A, the coordinator node 21 of the second piconet 20 enters a start time of the active period (step 501) and determines whether a collision has occurred during the channel sensing period (step 503). In this case, the coordinator node 21 of the second piconet 20 senses a collision by detecting the use of a channel due to the transmission of TDMA data by the coordinator node 11 of the first piconet 10 (step 503) and enters a reception standby state. The coordinator node 21 of the second piconet 20 waits for the AD message 200 of a known format to be received (step 509).

As the TDMA period ends in the first piconet 10, the coordinator node 11 of the first piconet 10 broadcasts the AD message 200 (steps 505 and 507).

The coordinator node 21 of the second piconet 20 receives the AD message during the reception standby period, transmits an acknowledgement (ACK) to the coordinator node 11 of the first piconet 10 (step 511), and updates a timetable (step 513). In this case, since the AD message 200 includes the CAP information 270 of the first piconet 10, the coordinator node 21 of the second piconet 20 can know when the CAP of the first piconet 10 is ended and broadcasts the AD message 200 during the CAP of the second piconet 20 (step 515). Upon receiving an ACK to the AD message 200 from the coordinator node 11 of the first piconet 10, the coordinator node 21 of the second piconet 20 determines that the AD message has successfully been transmitted (step 517) and enters the CAP (step 519). The reason why the coordinator node 21 of the second piconet 20 broadcasts the AD message 200 and enters the CAP is that a third piconet, which may have received the broadcast AD message 200, may now transmit its own AD message.

Since the AD message 200 includes information about the time slot start time 240 and the time slot length 250 of the first piconet 10, the coordinator node 21 of the second piconet 20 can know the data transmission period of the first piconet 10 and know the transmission time of the AD message 200. Therefore, the coordinator node 21 of the second piconet 20 can avoid data transmission during the data transmission period of the first piconet 10 and can receive the AD message 200 by setting an active state at the transmission time of the AD message 200 of the first piconet 10 (steps 531, 533, and 535).

If no AD message is received during the CAP (step 521), the coordinator node 21 of the second piconet 20 senses whether data collision occurs by setting the channel sensing period (step 527). If no data collision is sensed, the coordinator node 21 of the second piconet 20 entered the inactive period (step 529).

Meanwhile, the coordinator node 11 of the first piconet 10 receives the AD message during the CAP from the coordinator node of the second piconet 20 (steps 519 and 521) and updates the timetable (step 523). If the CAP has ended (step 525), the coordinator node 11 of the first piconet 10 senses whether data collision occurs by setting the channel sensing period (step 527). If no data collision is sensed, the coordinator node 11 of the first piconet 10 enters the inactive period (step 529).

Although FIG. 6B shows an example in which the first piconet 10 enters the inactive period after the first super-frame has ended, the case where a channel is sensed before the first piconet 10 enters the inactive period is shown in FIG. 7.

In FIG. 7, situation 450 shows the case where a CAP of the first piconet 10 and a TDMA period of the second piconet 20 collide with each other where the present invention is not applied. In this case, it is impossible to exchange the AD message between the two piconets.

In FIG. 7, situation 460 shows the case where the present invention is applied to the situation 450.

The coordinator node 11 of the first piconet 10 determines whether a channel is sensed when a super-frame period has ended or determines whether a collision occurs according to a packet loss state during a CAP (following steps 501, 503, 505, 507, 519, 521, 525, and 527). If it is determined that there are factors having an influence on the transmission and reception of first piconet 10, the coordinator node 11 of the piconet 10 does not directly enter the inactive mode and instead enters the reception standby state to wait for the AD message 200 of a known format to be received (step 509). The next operation is the same as in FIG. 8.

The TDMA period of the second piconet 20 ends (shown in steps 501, 503, and 505) and the coordinator node 21 of the second piconet 20 broadcasts the AD message (step 507).

The coordinator node 11 of the first piconet 10 receives the AD message 200 and updates the timetable (steps 511 and 513), and transmits the AD message 200 of the first piconet 10 during the CAP of the second piconet 20 (steps 515 and 517). In this case, since the coordinator node 11 of the first piconet 10 has already received the AD message 200 of the second piconet 20, it can know through information included in the AD message 200 when the CAP of the second piconet 220 has ended.

In the above examples, an operating process which can receive the AD message 200 when two piconets collide with each other as in FIGS. 6A, 6B, and 7 has been described. If the AD message 200 is received, TDMA periods of the piconets can be known and a transmission time of the AD message transmitted after the end of the TDMA period of a neighboring piconet can be determined. Thus, a recent AD message can be continuously received.

The present invention may also be applied when three or more piconets collide. This is because the AD message is transmitted to a CAP of a neighboring piconet and thus the AD message is naturally transmitted by a contention scheme. In rare cases, if a large number of piconets collide simultaneously, it will be necessary to appropriately increase a CAP. FIG. 8 shows the cases where three piconets collide and a collision problem is solved, as indicated by situations 470 and 480.

The present invention may operate without any problems even when piconets operate in non-beacon mode and a TDMA period is increased due to retransmission. In FIG. 9, the coordinator node 21 of the second piconet 20 is scheduled to receive the AD message 200 at the end of a TDMA period of the first piconet 10 (as shown in steps 531, 533, and 535) but the AD message 200 is delayed due to a variable increase of the TDMA period of the first piconet 10. If the AD message 200 is not received at a scheduled time (step 535), the second piconet 20 waits for the AD message 200 to be received or until a predictable or predetermined maximum TDMA delay time (step 539). If no AD message is received, the second piconet 20 determines that the piconet 10 has moved away and escapes a collision situation. The TDMA period of the first piconet 10 in the timetable is deleted (step 541). If the AD message 200 is received, the procedures described previously are performed (step 537).

According to embodiments of the present invention, a high channel utilization ratio is provided in a high contention environment of a WBAN, data transmission collisions can be reduced when a plurality of piconets is adjacent to each other, data transmission delay can be prevented, and overhead generated by time synchronization during TDMA data transmission can be decreased.

Although the embodiments of the present invention have been disclosed for illustrative purposes, various modifications, additions and substitutions are possible, without departing from the scope and spirit of the invention as disclosed in the accompanying claims. For example, upon receiving the AD message, if the AD message 200 is a message which is first received by a piconet, a coordinator node of the piconet transmits its AD message as a response, but if not, the coordinator node may not transmit its AD message. Accordingly, the scope of the present invention should not be limited to the description of the embodiment, but defined by the accompanying claims and equivalents thereof.

What is claimed is:

1. A method for communicating, by a first node included in a body area network communicating with at least one neighboring second node, the method comprising:
transmitting or receiving data to or from at least one neighboring second node connected to the first node during a first time period in a super-frame;
broadcasting a portion of first time sharing information of the first node to the at least one neighboring second node during a second time period within the super-frame;
receiving second time sharing information transmitted from the at least one neighboring second node after the second time period within the super-frame; and
adjusting a length of the super-frame or an inactive duration using the second time sharing information,
wherein the second time period is placed after the first time period and before a contention access period (CAP) in a sequential arrangement.

2. The method of claim 1, wherein each of the first time sharing information and the second time sharing information includes information about a time division communication period to be used by a corresponding node and information about the CAP of the corresponding node.

3. The method of claim 1, wherein transmitting or receiving the data includes sequentially transmitting or receiving the data through a time slot allocated to the at least one neighboring second node.

4. The method of claim 1, further comprising updating a timetable in which time information related to a time slot is stored.

5. A first node included in a body area network communicating with at least one neighboring second node, the first node comprising:
a transceiver; and
a processor configured to:
control the transceiver to transmit or receive data to or from at least one neighboring second node connected to the first node during a first time period in a super-frame,
control the transceiver to broadcast a portion of first time sharing information to the at least one neighboring second node during a second time period within the super-frame,
control the transceiver to receive a request for a super-frame adjustment transmitted from the at least one neighboring second node, and
adjust a length of the super-frame or an inactive duration using the second time sharing information,
wherein the second time period is placed after the first time period and before a contention access period (CAP) in a sequential arrangement.

6. The first node of claim 5, wherein the at least one neighboring second node transmits second time sharing information, and
wherein each of the first time sharing information and the second time sharing information include information about a time period to be used by a corresponding node and information about the CAP of the corresponding node.

7. The first node of claim 5, wherein the processor is further configured to control the transceiver to sequentially transmit or receive data through a time slot allocated to the at least one neighboring second node.

8. The first node of claim 5, wherein the processor is further configured to update a timetable including time information related to a time slot stored in a memory.

9. A method for communicating, by a first node included in a body area network, with at least one neighboring second node, the method comprising:
allocating at least one time slot included in a first time period to at least one neighboring second node connected to the first node in a super-frame;
broadcasting a portion of first time sharing information to the at least one neighboring second node during a second time period in the super frame after the first time period; and
receiving a request for a super-frame adjustment transmitted from the at least one neighboring second node,
wherein the second time period is placed after the first time period and before a contention access period (CAP) in a sequential arrangement.

10. The method of claim 9, further comprising:
receiving second time sharing information transmitted from the at least one neighboring second node; and
adjusting a length of the super-frame or an inactive duration using the second time sharing information.

11. The method of claim 10, wherein each of the first time sharing information and the second time sharing information includes information about a time period to be used by a corresponding node and information about the CAP of the corresponding node.

12. The method of claim 9, further comprising:
sequentially transmitting or receiving data through the time slot allocated to the at least one neighboring second node during the first time period.

13. The method of claim 9, further comprising:
updating a timetable in which time information is related to the time slot.

14. A first node included in a body area network communicating with at least one neighboring second node, the first node comprising:
a transceiver; and
a processor configured to:
allocate at least one of time slots included in a first time period to at least one neighboring second node connected to the first node in a super-frame, control the transceiver to transmit a portion of first time sharing information to the at least one neighboring second node during a second time period, and
receive a request for a super-frame adjustment transmitted from the at least one neighboring second node,
wherein the second time period is placed after the first time period and before a contention access period (CAP) in a sequential arrangement.

15. The first node of claim 14, wherein the processor is further configured to control the transceiver to receive second time sharing information transmitted from the at least one neighboring second node, and
adjust a length of the super-frame or an inactive duration using the second time sharing information.

16. The first node of claim 15, wherein each of the first time sharing information and the second time sharing information includes information about a time period to be used by a corresponding node and information about the CAP of the corresponding node.

17. The first node of claim 14, wherein the processor is further configured to control the transceiver to sequentially transmit or receive data through the time slot to be allocated to the at least one neighboring second node during the first time period.

18. The first node of claim 14, wherein the processor is further configured to update a timetable including time information related to a time slot stored in a memory.

19. A method for communicating, by a first node included in a body area network, with at least one neighboring second node, the method comprising:
- allocating at least one of time slots included in a first time period within one super-frame to at least one neighboring second node connected to the first node;
- forming a second time period for broadcasting a portion of first time sharing information in the one super-frame; and
- forming a contention access period (CAP) for receiving second time sharing information transmitted from the at least one neighboring second node,
- wherein the second time period is placed after the first time period and before the CAP in a sequential arrangement.

20. The method of claim 19, wherein each of the first time sharing information and the second time sharing information includes information about a time period to be used by a corresponding node and information about the CAP of the corresponding node.

21. The method of claim 19, further comprising:
- adjusting a length of the super-frame or an inactive duration using the second time sharing information.

22. The method of claim 19, further comprising:
- sequentially transmitting or receiving data through a time slot allocated to the at least one neighboring second node during the first time period.

23. The method of claim 19, further comprising:
- broadcasting the first time sharing information to the at least one neighboring second node during the second time period.

24. A method for communicating, by a first node included in a body area network, connecting with at least one neighboring second node, the method comprising:
- sensing whether there is a channel collision when a current time point is a start time of an active period;
- if no channel collision is sensed, entering a first time period and transmitting data or receiving data to or from at least one neighboring second node connected to the first node;
- if the first time period has ended, broadcasting a portion of first time sharing information of the first node to the at least one neighboring second node;
- receiving second time sharing information of the at least one neighboring second node during a contention access period (CAP); and
- adjusting a length of a super-frame or an inactive duration using the second time sharing information,
- wherein the second time period is placed after the first time period and before the CAP in a sequential arrangement.

25. The method of claim 24, wherein each of the first time sharing information and the second time sharing information includes information about a time period to be used by a corresponding node and information about the CAP of the corresponding node.

26. The method of claim 25, further comprising:
- sensing whether there is the channel collision when the CAP of the corresponding node is ended;
- if the channel collision is sensed, waiting for an arbitrary time division schedule advertisement message to be received;
- receiving the arbitrary time division schedule advertisement message; and
- adjusting a data transmission time or data reception time for the at least one neighboring second node connected to the first node.

27. The method of claim 26, further comprising:
- broadcasting the first time sharing information if the arbitrary time division schedule advertisement message is first received from the corresponding node.

28. The method of claim 26, further comprising:
- receiving the second time sharing information or arbitrary time division schedule advertisement message by entering an active period at an expected reception time point of the second time sharing information or the arbitrary time division schedule advertisement message.

* * * * *